(12) United States Patent  (10) Patent No.: US 7,835,150 B2
Degner et al.  (45) Date of Patent: Nov. 16, 2010

(54) PORTABLE COMPUTER LATCH STRUCTURES

(75) Inventors: Brett W. Degner, Menlo Park, CA (US); John Brock, San Francisco, CA (US); Patrick Kessler, Mountain View, CA (US); Chris Ligtenberg, San Carlos, CA (US)

(73) Assignee: Apple Inc., Cupertino, CA (US)

( * ) Notice: Subject to any disclaimer, the term of this patent is extended or adjusted under 35 U.S.C. 154(b) by 67 days.

(21) Appl. No.: 12/335,517

(22) Filed: Dec. 15, 2008

(65) Prior Publication Data

US 2010/0091454 A1 Apr. 15, 2010

Related U.S. Application Data

(60) Provisional application No. 61/105,038, filed on Oct. 13, 2008.

(51) Int. Cl.
*G06F 1/16* (2006.01)
(52) U.S. Cl. .................................. 361/679.58
(58) Field of Classification Search ............ 361/679.58, 361/679.41
See application file for complete search history.

(56) References Cited

U.S. PATENT DOCUMENTS

| | | | |
|---|---|---|---|
| 4,991,058 A | 2/1991 | Watkins et al. | |
| 5,670,267 A | 9/1997 | Lee | |
| 5,764,477 A * | 6/1998 | Ohgami et al. | 361/679.55 |
| 6,442,637 B1 * | 8/2002 | Hawkins et al. | 361/679.41 |
| 6,469,900 B2 * | 10/2002 | Cheng | 361/726 |
| 6,660,427 B1 | 12/2003 | Hukill et al. | |
| 6,678,154 B2 * | 1/2004 | DeLuga | 361/679.58 |
| 6,944,016 B2 * | 9/2005 | Chen et al. | 361/679.33 |
| 6,992,886 B2 * | 1/2006 | Salinas et al. | 361/679.38 |
| 7,095,607 B2 * | 8/2006 | Imamura | 361/679.57 |
| 7,333,324 B2 * | 2/2008 | DeLuga | 361/679.55 |
| 7,646,613 B2 | 1/2010 | Ligtenberg et al. | |
| 2003/0223192 A1 * | 12/2003 | Searby et al. | 361/683 |
| 2006/0141344 A1 | 6/2006 | Chen et al. | |
| 2006/0172183 A1 | 8/2006 | Chen et al. | |
| 2007/0030635 A1 * | 2/2007 | Song | 361/683 |
| 2007/0031727 A1 | 2/2007 | Hsu | |
| 2007/0111086 A1 | 5/2007 | Li et al. | |
| 2007/0117598 A1 | 5/2007 | Yang et al. | |
| 2008/0013268 A1 | 1/2008 | Wong et al. | |

* cited by examiner

*Primary Examiner*—Lisa Lea-Edmonds
(74) *Attorney, Agent, or Firm*—Treyz Law Group; G. Victor Treyz

(57) ABSTRACT

A portable computer is provided that has a housing. A battery may be contained within the housing. The housing may have panels such as a fixed housing panel and a removable access panel. A lever actuated latching mechanism may be used to lock the removable access panel and the battery within the portable computer. A lock may be used to block movement of the lever and thereby prevent access to the interior of the computer. Magnetic elements may be used to facilitate operation of the lever and to hold the access panel in place. The latch mechanism may provide mechanical advantage when disengaging the magnets that hold the access panel.

19 Claims, 18 Drawing Sheets

PORTABLE COMPUTER LATCH STRUCTURES

This application claims the benefit of provisional patent application No. 61/105,038, filed Oct. 13, 2008, which is hereby incorporated by reference herein in its entirety.

BACKGROUND

This invention relates to electronic devices and, more particularly, to latch structures for electronic devices such as portable computers.

Portable computers often have detachable covers. In a typical scenario, a main logic board and computer components such as a hard drive and optical disk drive are mounted in a computer housing. The housing may be formed from upper and lower halves that are secured by screws. In the event that an interior portion of the computer requires servicing, service personnel may disassembly the upper and lower housing portions to gain interior access.

While this type of arrangement may be satisfactory for permitting occasional access to interior computer components, housings that have portions attached by screws are generally too cumbersome to use in situations in which more frequent interior access is desired. For example, if a user desired to access the interior of a computer to make an adjustment or to replace a depleted battery with a freshly charged battery, requiring the user to disassemble the computer with a screwdriver would be unacceptable.

Many portable computers are provided with externally mounted batteries. Because this type of battery does not require internal housing access, the need for disassembly the computer case to exchange batteries is avoided. However, the appearance of externally mounted batteries tends not to be aesthetically pleasing. Externally mounted batteries often protrude significantly from the housing of the computer, leading to an unsightly bulge in the rear part of the housing. Moreover, external battery mounting arrangements do not address the difficulties associated with providing access to the interior of the computer for other purposes.

It would therefore be desirable to provide portable computers with improved structures such as housing cover latch structures for providing aesthetically pleasing and secure battery storage and interior housing access.

SUMMARY

A portable computer with improved latch structures is provided. A latch for a portable computer may have a sliding rack member. Features on the rack member may be used to engage a battery and an access panel on the portable computer. A lever may be used to actuate the rack. When the lever is in a closed position, the battery may be held in place within the computer. The access panel may also be engaged. Magnets may help to hold the access panel in place. In the event of a shock that dislodges the access panel from the magnets, hooks may hold the access panel in place.

When it is desired to lock the system, a lock may be inserted into the housing of the portable computer. The lock may prevent opening of the lever and thereby prevent the rack from moving. Because movement of the rack is blocked, the access panel cannot be removed. This enhances security, because interior components of the portable computer such as its hard drive cannot be readily removed.

When the lock is not in place, the lever can be opened to move the rack and allow the access panel to be removed. Movement of the rack helps to disengage the access panel from the magnets. Magnets may also be used in the lever mechanism.

Further features of the invention, its nature and various advantages will be more apparent from the accompanying drawings and the following detailed description of the preferred embodiments.

DETAILED DESCRIPTION

The present invention relates to portable computer structures such as latching structures for portable computers. Latching structures may be associated with a latch. When the latch is in a closed position, the latching structures may help to secure portable computer structures in place within a portable computer. For example, the latch structures may help to hold a battery in place within the portable computer and may help to hold a cover to the case of the computer. The battery may be mounted within the interior of the computer and may be hidden by the cover. When the latch is in an open position, the cover and battery may be released.

To prevent unauthorized access to the interior of the computer, the latch may be locked. For example, the latch may be locked by inserting and locking a lock to the computer case in the vicinity of the latch. The lock may also be used to hold the computer to a stationary object such as a desk via a security cable. The presence of the lock may prevent the latch from opening and thereby prevent the cover of the computer from being removed. Because the cover of the computer cannot be removed, the interior of the computer and sensitive components that are housed within the interior such as hard drive and other storage components and processing circuitry cannot be accessed.

Figure 1:
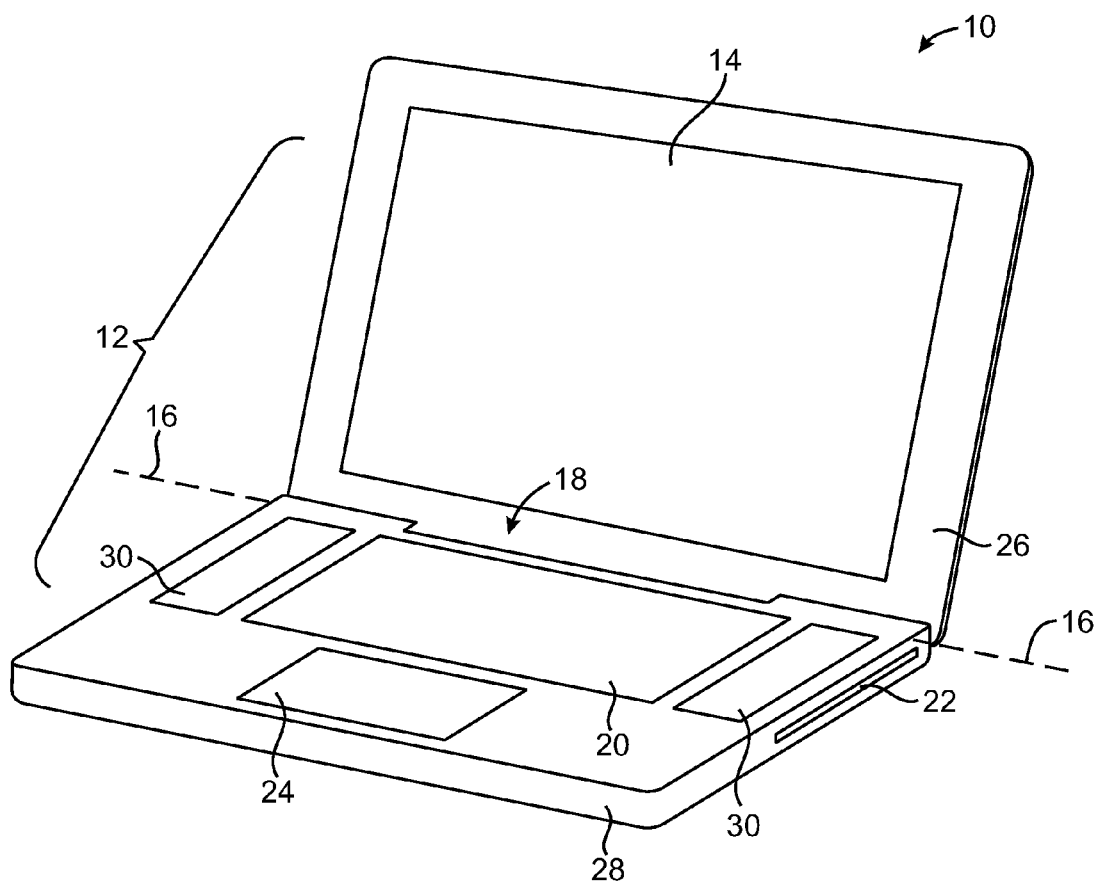
FIG. 1 is a perspective view of an illustrative electronic device such as a portable computer having latch structures in accordance with an embodiment of the present invention.

An illustrative electronic device such as a portable computer in which the portable computer structures may be provided is shown in FIG. 1. As shown in FIG. 1, portable computer 10 may have a housing 12. Housing 12, which is sometimes referred to as a case, may be formed from one or more individual structures. For example, housing 12 may have a main structural support member that is formed from a solid block of machined aluminum or other suitable metal. One or more additional structures may be connected to the housing 12. These structures may include, for example, internal frame members, external coverings such as sheets of metal, etc. Housing 12 and its associated components may, in general, be formed from any suitable materials such as such as plastic, ceramics, metal, glass, etc. An advantage of forming housing 12 at least partly from metal is that metal is durable and attractive in appearance. Metals such as aluminum may be anodized to form an insulating oxide coating.

Case 12 may have an upper portion 26 and a lower portion 28. Lower portion 28 may be referred to as the base or main unit of computer 10 and may contain components such as a hard disk drive, battery, and main logic board. Upper portion 26, which is sometimes referred to as a cover or lid, may rotate relative to lower portion 28 about rotational axis 16. Portion 18 of computer 10 may contain a hinge and associated clutch structures and is sometimes referred to as a clutch barrel.

Lower housing portion 28 may have a slot such as slot 22 through which optical disks may be loaded into an optical disk drive. Lower housing portion may also have a touchpad such as touchpad 24 and may have keys 20. If desired, additional components may be mounted to upper and lower housing portions 26 and 28. For example, upper and lower housing portions 26 and 28 may have ports to which cables can be connected (e.g., universal serial bus ports, an Ethernet port, a Firewire port, audio jacks, card slots, etc.). Buttons and other controls may also be mounted to housing 12.

If desired, upper and lower housing portions 26 and 28 may have transparent windows through which light may be emitted (e.g., from light-emitting diodes). This type of arrangement may be used, for example, to display status information to a user. Openings may also be formed in the surface of upper and lower housing portions to allow sound to pass through the walls of housing 12. For example, openings may be formed for microphone and speaker ports. With one illustrative arrangement, speaker openings such as speaker openings 30 may be formed in lower housing portion 28 by creating an array of small openings (perforations) in the surface of housing 12.

A display such as display 14 may be mounted within upper housing portion 26. Display 14 may be, for example, a liquid crystal display (LCD), organic light emitting diode (OLED) display, or plasma display (as examples). A glass panel may be mounted in front of display 14. The glass panel may help add structural integrity to computer 10. For example, the glass panel may make upper housing portion 26 more rigid and may protect display 14 from damage due to contact with keys or other structures.

Computer 10 may have input-output components such as touch pad 24. Touch pad 24 may include a touch sensitive surface that allows a user of computer 10 to control computer 10 using touch-based commands (gestures). A portion of touchpad 24 may be depressed by the user when the user desires to "click" on a displayed item on screen 14.

Figure 2:
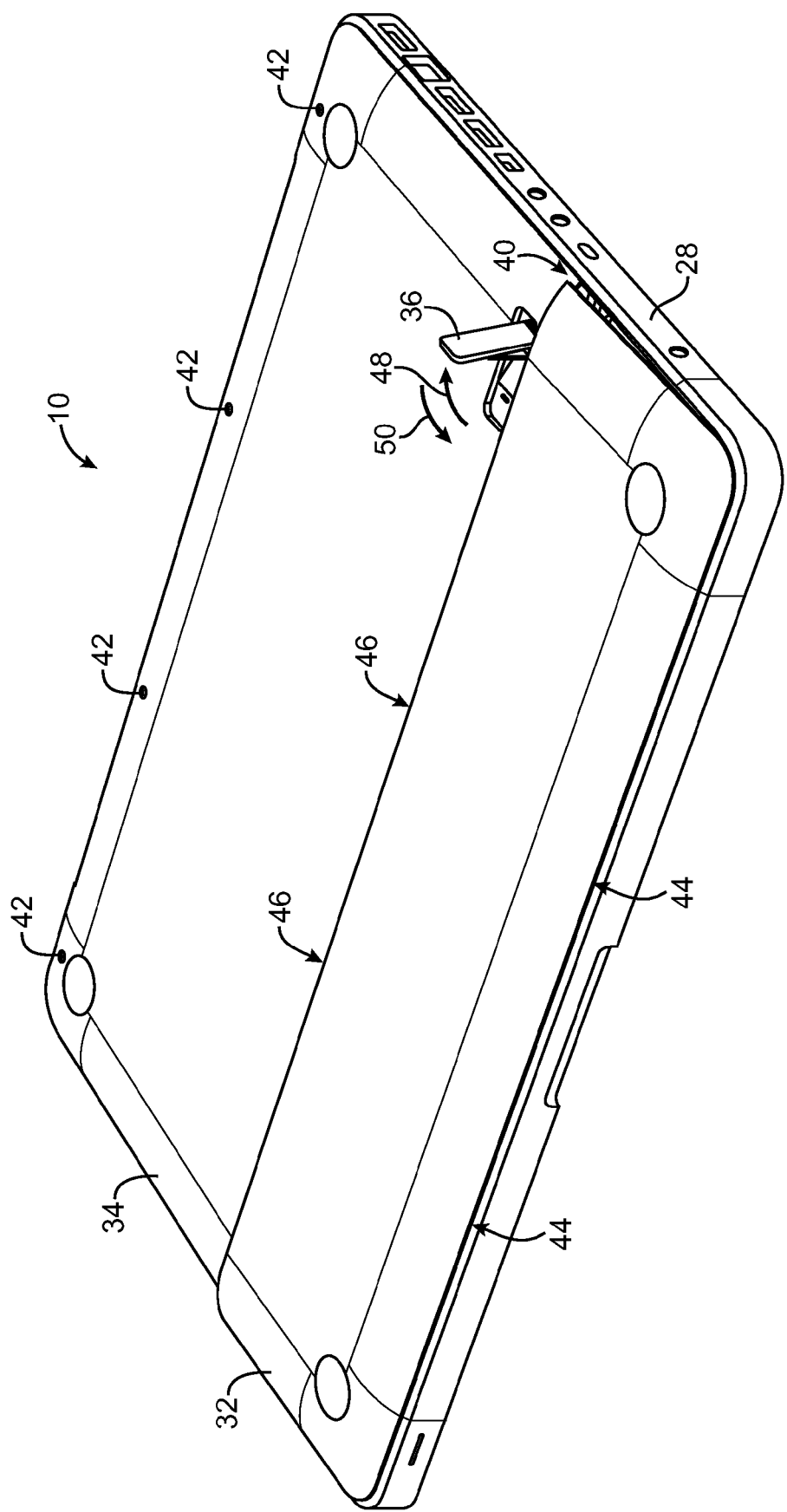
FIG. 2 is a perspective view of an underside portion of an illustrative portable computer having a latch in a partly open configuration that allows a lower housing portion to be removed from the computer in accordance with an embodiment of the present invention.

A perspective view of the bottom of computer 10 is shown in FIG. 2. As shown in FIG. 2, part of the exterior surface of the bottom portion of housing 12 for computer 12 may be formed by fixed housing panel 34 and removable access panel 32. Panels 32 and 34 may be formed from thin sheets of a rigid material such as anodized aluminum. Panels 32 and 34 may be mounted to lower housing portion 28. Fixed housing panel 34 may be attached to lower housing portion 28 by screws 42. Along front edge 44, prongs on the underside of removable access panel 32 may mate with features in lower housing portion 28. Along interior edge 46, hooks on the underside of removable access panel 32 may mate with latch structures. When the latch is in the closed position, access panel 32 may be secured to housing portion 28 by the hooks. The latch structures in computer 10 may also be used in securing a battery. When the latch is in the open position, the removable access panel and battery may be removed.

Magnets may be used to secure removable access panel 32 to housing 28 along edge 46. When it is desired to remove access panel 32 from computer 10, the user must overcome the force of the magnets. The latch mechanism that is used in securing removable access panel 32 may be used to help "strip" the access panel from the magnets. The magnets exert a strong attraction on removable access panel 32 at close distances. To strip the access panel from the magnets, the latching mechanism lifts the removable access panel upwards to form a gap such as gap 40. At this distance, the attraction from the magnets is significantly reduced and the latch mechanism is physically disengaged from the hooks on the removable access panel. This allows a user to easily remove the removable access panel 32 from lower housing portion 28.

An actuating mechanism such as lever 36 may be used to control operation of the latching mechanism. When lever 36 lies flush with the surface of fixed housing panel 34, the latch mechanism is locked. When lever 36 is rotated upwards in direction 48, the latch mechanism unlocks and forces removable access panel 32 upwards to form gap 40. When it is desired to lock panel 32 in place on housing 28, the user may rotate lever 36 in direction 50.

Figure 3:
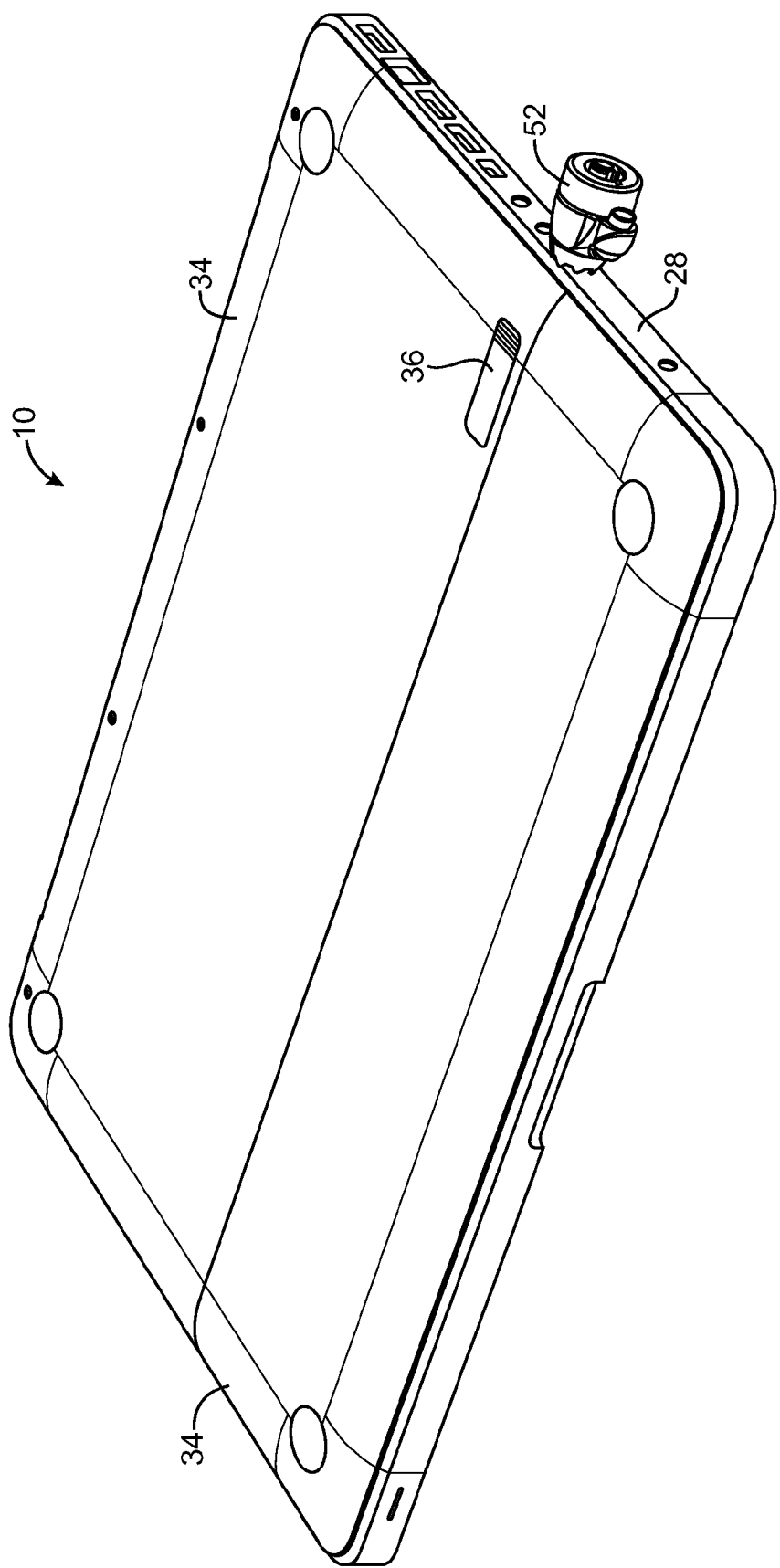
FIG. 3 is a perspective view of an underside portion of an illustrative portable computer having a latch in a closed configuration that holds a lower housing portion to the computer in accordance with an embodiment of the present invention.

FIG. 3 shows lever 36 in its stowed position. A magnet may be used to help retain lever 36 in this configuration when not in use.

A lock (bolt) such as lock 52 may have an associated plunger. A cable may optionally be attached to lock 52. When it is desired to lock computer 10 to a desk or other stationary object, the plunger of lock 52 may be inserted in a mating rectangular opening in computer 10. The plunger may have a T-shaped portion that can be turned perpendicular to the rectangular opening during locking. This holds the lock to computer 10. The cable that is attached to lock 52 may then be connected to a desk to lock down computer 10.

In addition to locking computer 10 to a desk or other object, lock 52 may be used to prevent lever 36 from moving. This, in turn, prevents an attacker from opening removable access panel 32. The attacker is therefore unable to access sensitive computer components in the interior of computer 10 such as hard drive and memory components.

Figure 4:
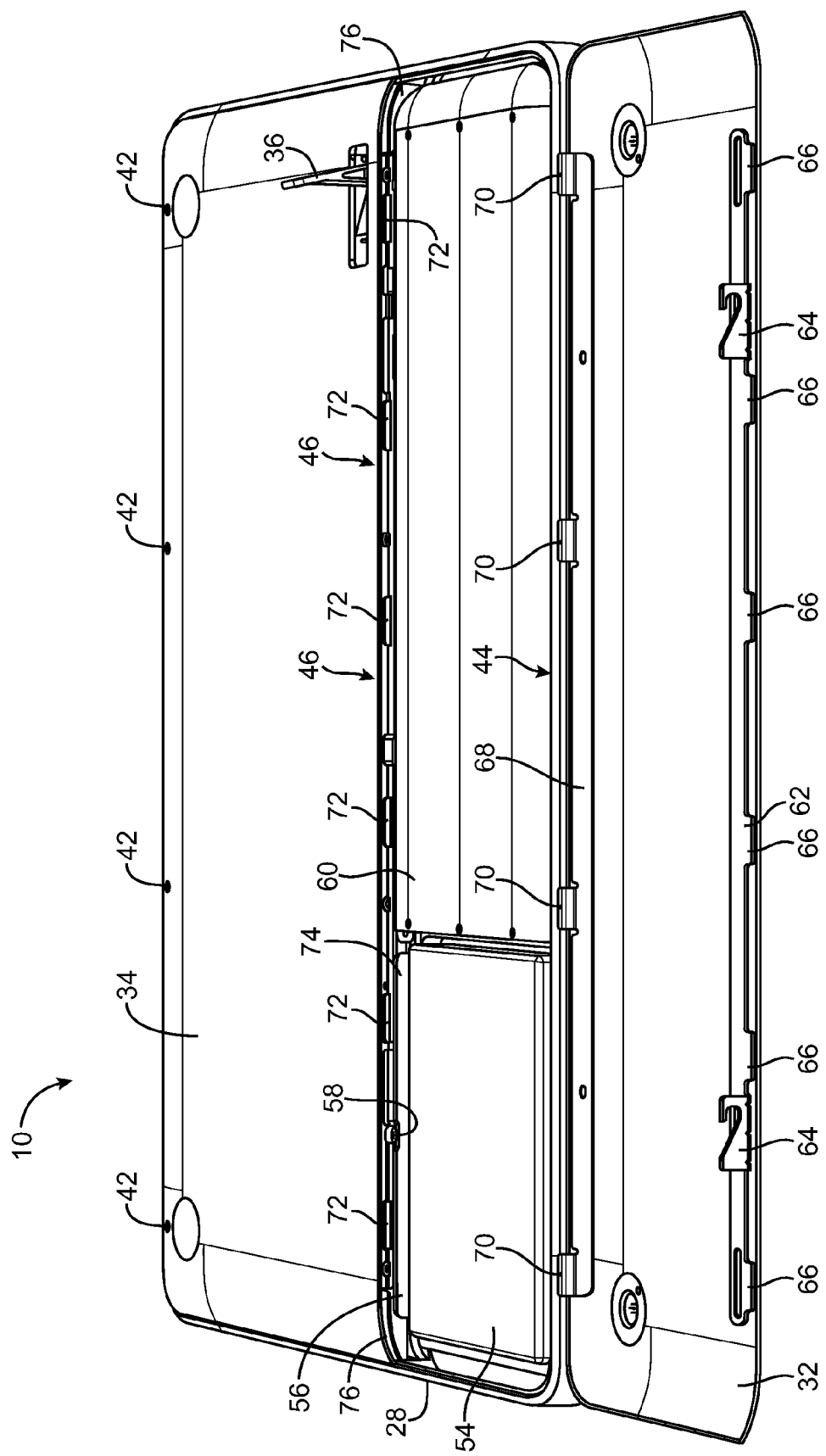
FIG. 4 is a perspective interior view of an underside portion of an illustrative portable computer with its lower housing portion removed and placed adjacent to the computer in accordance with an embodiment of the present invention.

In the view of FIG. 4, removable access panel 32 has been removed from computer 10 and has been placed with its interior face up. Aluminum is not a magnetic material, so for proper operation of the magnetic latch feature of computer 10, it may be desirable to attach a magnetic material to the inside of panel 32. The magnetic material that is attached may be provided as individual structures or as a strip. The magnetic material may be a magnet, or a magnetic material such as steel. In the example of FIG. 4, magnetic metal strip 62 has been attached to panel 32. Magnetic metal strip 62 may be formed from nickel-plated steel, chrome-plated steel, or magnetic stainless steel (as examples).

Magnetic strip 62 may have hooks 64 that engage corresponding structures associated with midwall member 76. Strip 62 may also have protrusions such as teeth 66. Each tooth 66 may mate with a corresponding recess 72 in bridge member 74. Bridge member 74 may be attached to the interior surface of fixed panel 34 along edge 46.

Metal strip member 68 may be connected along the outer edge of access panel 32. Prongs 70 on strip member 68 may engage a lip or recesses along edge 44 of lower housing portion 28 to hold removable access panel 32 in place along this edge of computer 10. With one suitable attachment mechanism, bridge member 74 is attached to panel 34 by welds or adhesive, strip member 62 is attached to panel 32 by welds or adhesive, and strip 68 is attached to panel 32 by welds or adhesive. Other attachment mechanisms may also be used if desired.

Computer 10 may include components such as battery 60 and hard disk drive 54. Battery 60 may have tabs that are engaged by the same latch mechanism that is used in engaging hooks 64 of removable access panel 32 when it is desired to attach removable access panel 32 to housing 28. Hard disk drive 54 may be mounted to housing portion 28 using rails such as rail 56. A screw such as screw 58 may be used to attach rail 56 to housing portion 28. The end of screw 58 may be formed in the shape of a screwdriver tip, allowing screw 58 to serve as a hidden screwdriver. When access panel 32 is removed a user can access the screwdriver and use it to remove screws 42. This allows the user to remove fixed panel 34 from housing portion 28 without tools.

Figure 5:
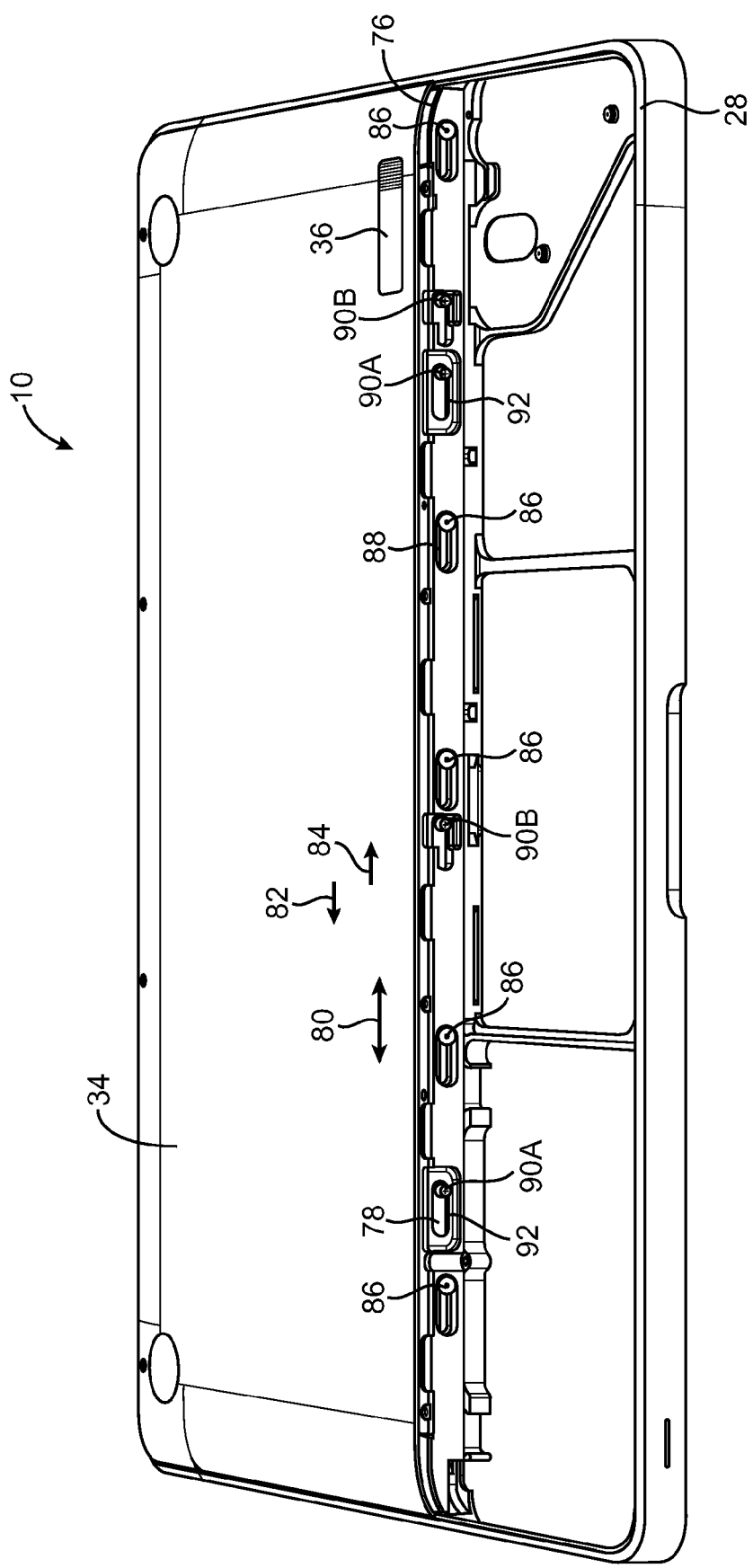
FIG. 5 is a perspective interior view of an underside portion of an illustrative portable computer with its lower housing portion removed to expose interior portions of the computer and latch structures associated with a closed latch in accordance with an embodiment of the present invention.

FIG. 5 shows how midwall member 76 may span the width of computer 10. A sliding rack member such as rack 78 may reciprocate along longitudinal axis 80 of midwall 76. Rack 78 may be formed from sheet metal or other suitable rigid materials. The lateral position of rack 78 may be controlled by the position of lever 36. When lever 36 is in its closed position flush with panel 34, rack 78 is moved to the right in direction 84. When lever 36 is in its open position, rack 78 is moved to the left in direction 82.

Attachment point guide structures 86 help guide rack 78 along midwall 76. Each attachment point guide structure may have a low friction bushing such as a plastic cylindrical member that is held in place on rack 78 by a screw. As rack 78 reciprocates along axis 80, attachment point guide structures move within corresponding openings 88 in midwall member 76.

Rolling latch members 90 (i.e., latch members 90A and 90B) may be attached to rack 78. Each latch member 90 may have a low friction mechanism such as a rolling bushing formed from a cylindrical plastic cylinder that surrounds a mating cylindrical protrusion on rack 78. Rolling latch members 90A may be used to engage hooks 64 on removable access panel 32. Rolling latch members 90B may be used to engage tabs on battery 60.

Figure 6:
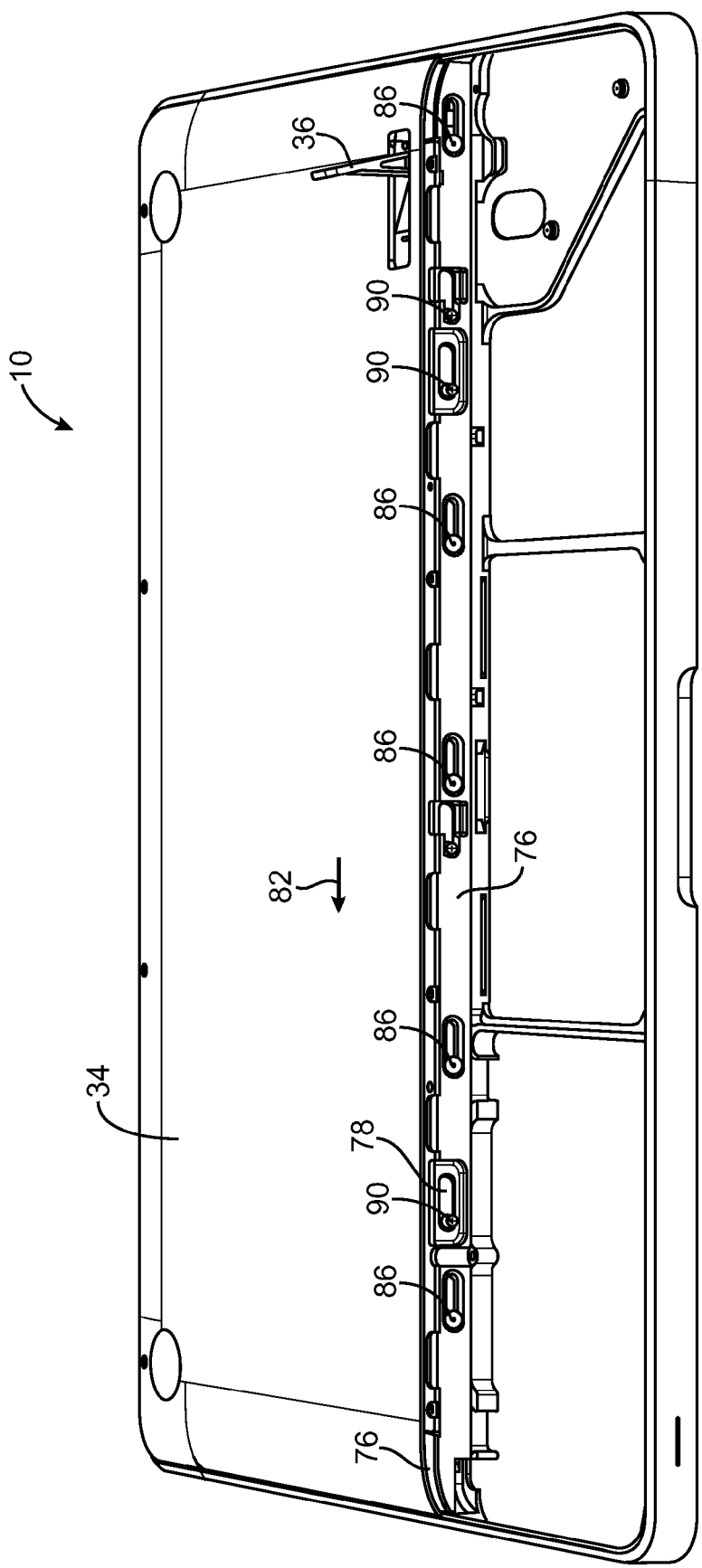
FIG. 6 is a perspective interior view of an underside portion of an illustrative portable computer with its lower housing portion removed to expose interior portions of the computer and latch structures associated with an open latch in accordance with an embodiment of the present invention.

As shown in FIG. 6, when lever 36 is placed in its open position, rail 78 moves in direction 82, moving guide structures 86 and rolling latch members 90 to the left. Guide structures 86 are preferably placed adjacent to rolling latch members 90 to ensure that rack 78 is guided properly along midwall member 76. The use of guide structures such as guide structures 86 helps prevent rack 78 from bending along its longitudinal axis, thereby ensuring smooth operation of the latch mechanism.

Figure 7:
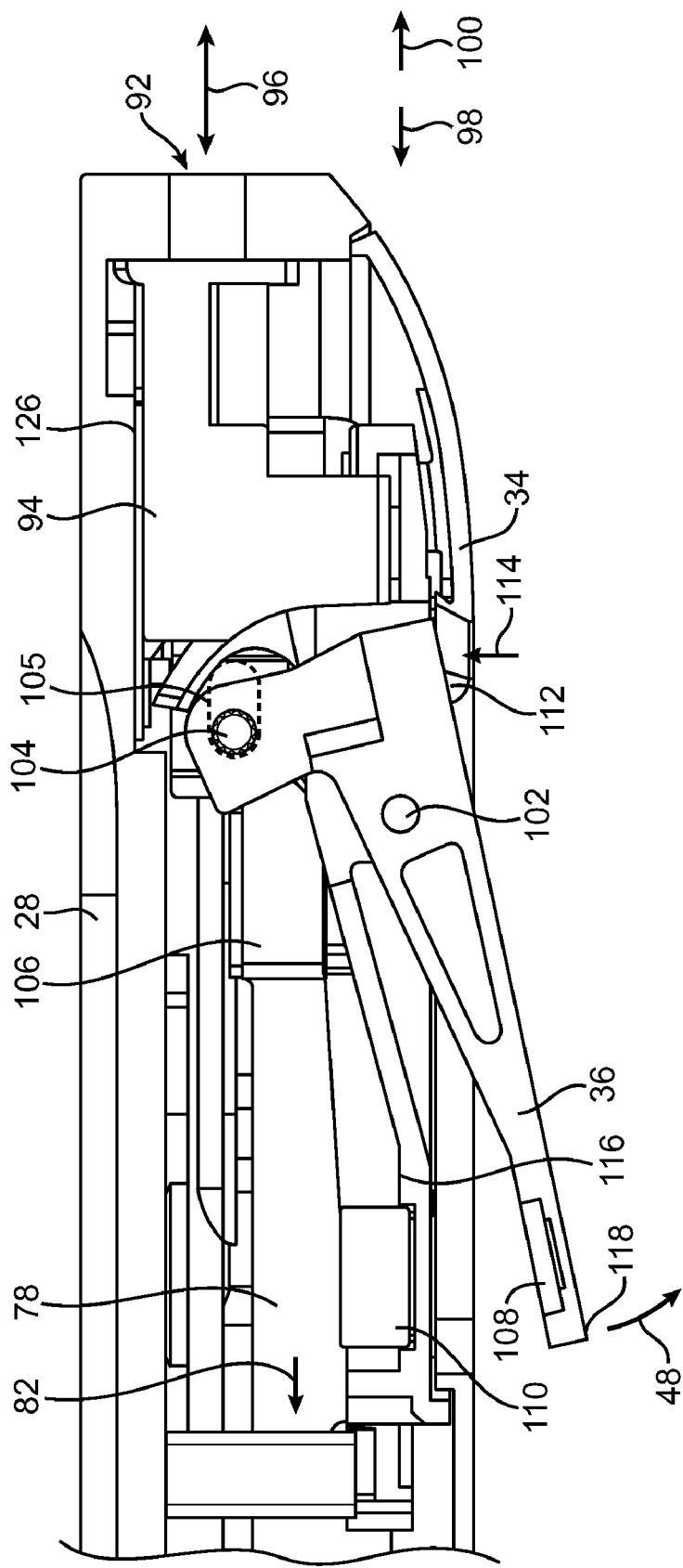
FIG. 7 is cross-sectional side view of a partially open latch in accordance with an embodiment of the present invention.

The movement of lever 36 may be used to control the movement of rack 78. As shown in FIG. 7, lever 36 may be attached to housing portion 28 by a plastic lever frame 116 using pivot shaft 102. Pin 104 may be used to connect lever 36 to plastic yoke 106. Yoke 106 may be rigidly screwed to rack 78 and may serve as an interface between lever 36 and rack 78. There is preferably a slot such as slot 105 in yoke 106 that allows pin 104 to reciprocate slightly without translating yoke 106. This serves to provide the latch mechanism with hysteresis. Because of the hysteresis, a user may move lever 36 slightly without encountering the friction associated with translating rack 78.

As an example, lever 36 may be in its stowed position. A user may want to grasp end 118 of lever 36. To deploy lever 36 to the position shown in FIG. 7, the user may press lightly on end 112 of lever 36 in direction 114. This will cause end 118 of lever 36 to move outwards in direction 48. Because of the hysteresis provided by the slot in yoke 106, there will be little resistance to moving lever 36 into the position shown in FIG. 7. Once this position has been obtained, a user may grasp lever 36 firmly and may then proceed to complete the desired lever movement in direction 48. This fully deploys lever 36. As lever 36 moves in direction 48, pin 104 is moved in direction 82, thereby moving yoke 106 and rack 78 in direction 82 to disengage the latch.

Lever 36 may have a magnetic stowage feature. Magnetic attraction may be provided using any suitable magnet arrangement. For example, lever 36 may be held in its stowed position using two magnets that attract each other or using a magnet and a corresponding magnetic metal such as steel may be used. In the example shown in FIG. 7, magnetic attraction plate 108 is mounted within end 118 of lever 36 (e.g., using adhesive) and is attracted to a corresponding magnet 110 mounted in a recess within lever frame 116.

Movement of lever 36 may be inhibited by attaching a lock though hole 92. Plunger 94 may be attached to housing portion 28 using sheet metal bracket 126 or other suitable attachment mechanism. Plunger 94 may reciprocate within housing 28 along longitudinal axis 96. When plunger 94 is moved in direction 100 into the position shown in FIG. 7, lever 36 is free to move. When plunger 94 is moved in direction 98, lever 36 is prevented from opening fully.

Figure 8:
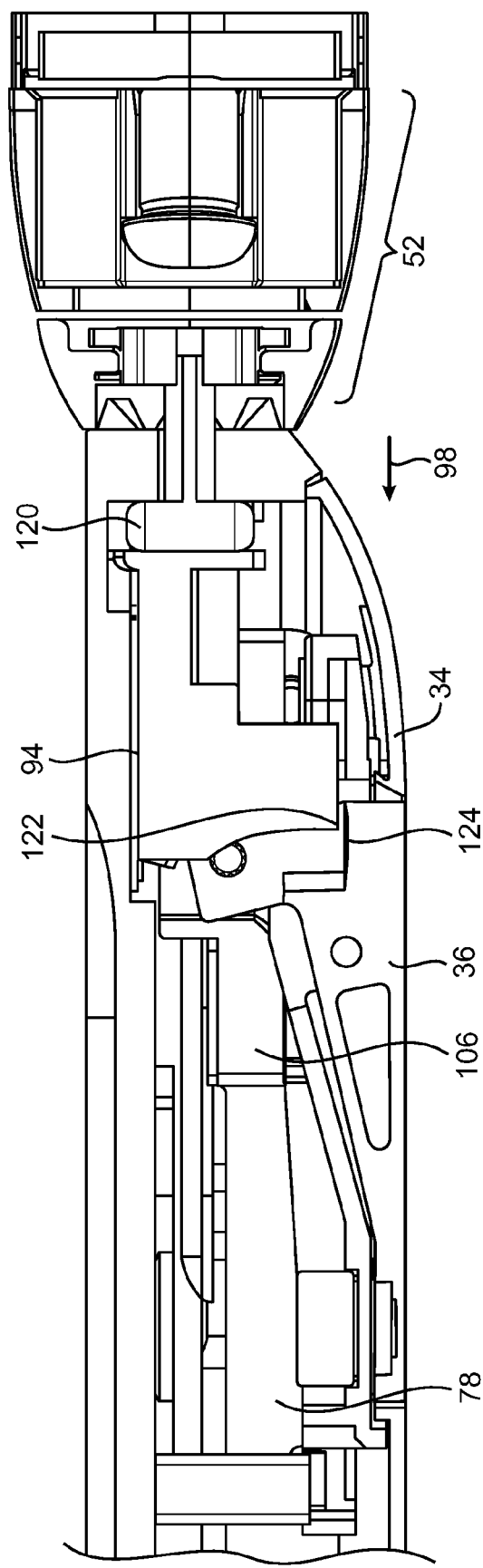
FIG. 8 is a cross-sectional side view of the latch of FIG. 7 showing how a lock that is separate from the computer may be inserted into the computer in the vicinity of the latch to prevent deployment of the latch and interior access to the computer in accordance with an embodiment of the present invention.

Hole 92 may have a rectangular surface opening on lower housing portion 28. When key-shaped locking member 120 (FIG. 8) is inserted in hole 92 and is turned to lock the lock 52 in place on housing 28, plunger 94 is pushed into housing portion 28 in direction 98, until the position of FIG. 8 is reached. In this position, lower surface 122 of plunger 94 engages shelf 124 of lever 36. If a user attempts to open lever 36, surface 122 will bear against shelf 124 of lever 36, thereby preventing further movement of lever 36. Because the user cannot open lever 36, the user cannot open the latching mechanism to remove removable access panel 32.

Figure 9:
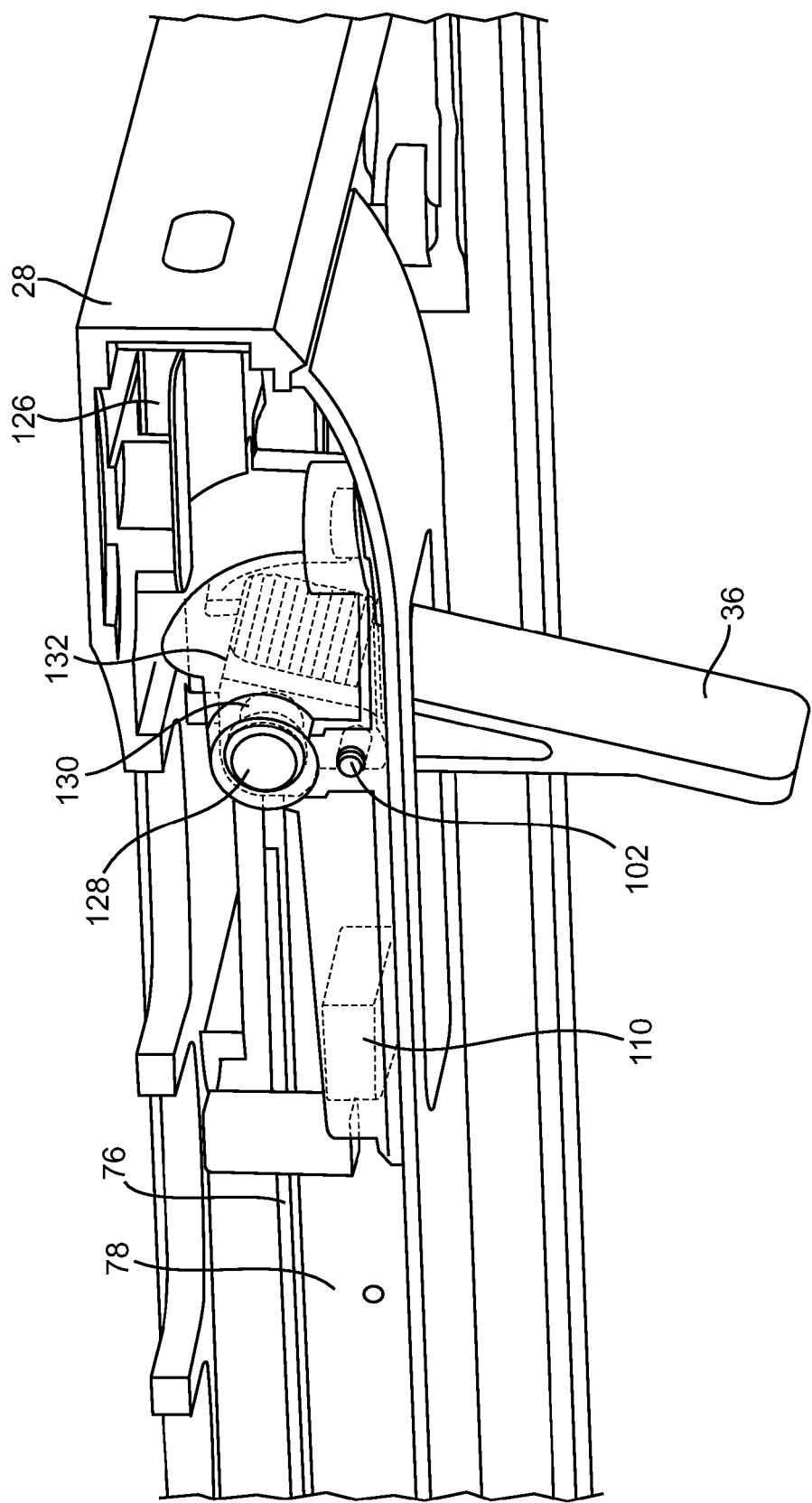
FIG. 9 is a cross-sectional side view of the latch of FIG. 7 in an open configuration in accordance with an embodiment of the present invention.

As shown in FIG. 9 (from which frame 116 has been removed for clarity), a magnet such as magnet 130 may be mounted to the side of lever 36 at lever end 132. A corresponding magnet 128 may be mounted to frame 116 (FIGS. 7 and 8). Magnets 128 and 130 may be configured to attract each other (or, if desired, a repulsive arrangement could be used). The interaction between magnets 128 and 130 may help hold lever 36 in its open position and may help to open the latch somewhat as the latching mechanism is being disengaged. Holding level 36 in the open position keeps the latching structure receptive to installation of components, an intuitive arrangement for the user.

Magnets 128 and 130 may be offset from each other when lever 36 is fully open. In this orientation, magnet 130 on lever 36 will be pulled more towards magnet 128 than if magnets 128 and 130 where perfectly aligned. When in the open lever position of FIG. 9, a stop on lever frame 116 (FIGS. 7 and 8) may prevent lever 36 from opening further.

Figure 10:
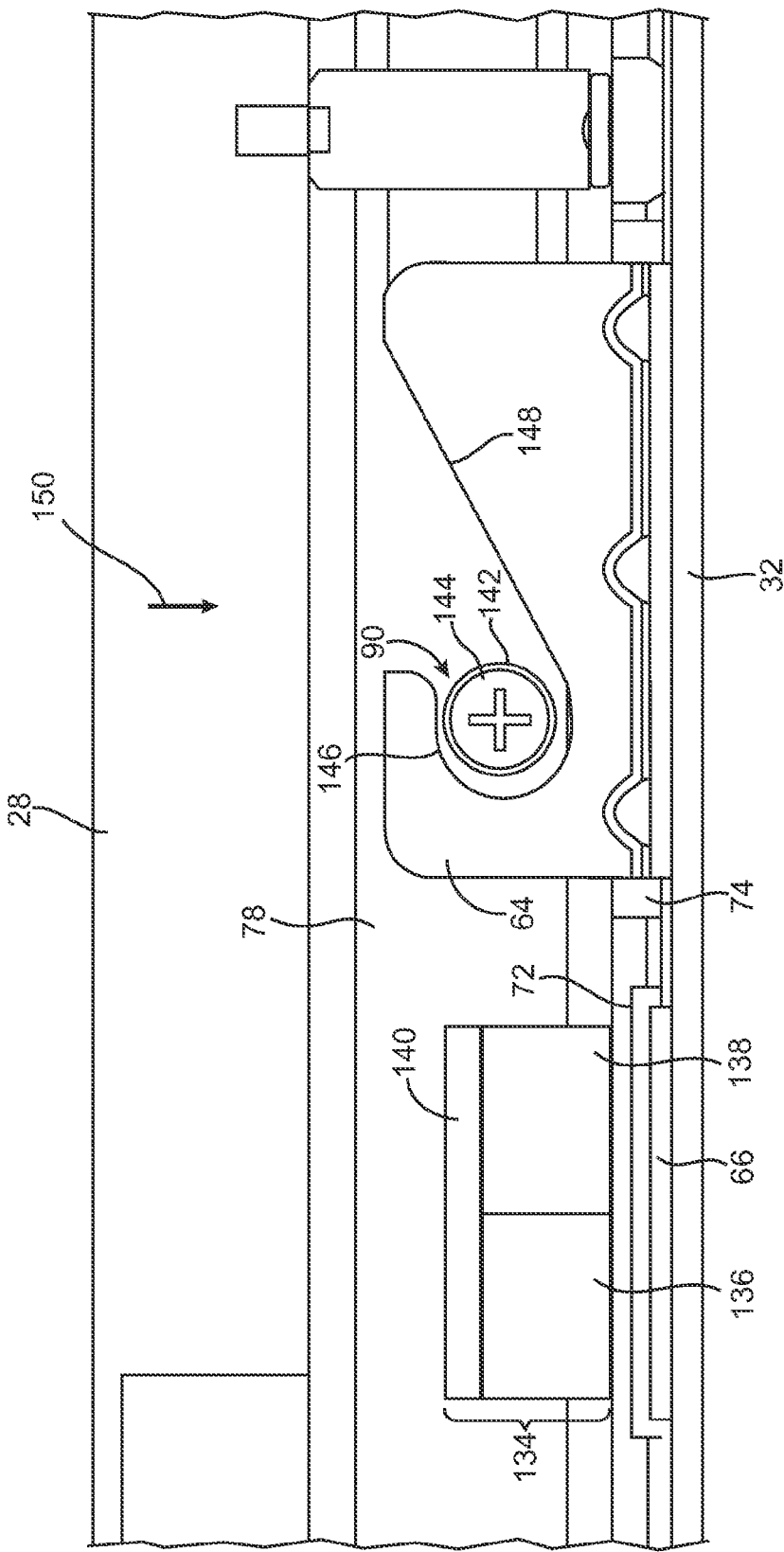
FIG. 10 is a side view of latch structures in which magnets and hooks are being used to hold computer components in place such as a battery and housing cover in accordance with an embodiment of the present invention.

FIG. 10 shows how magnetic attraction may be used to help hold access panel 32 in place. In the view of FIG. 10, midwall 76 is not shown for clarity. A series of magnet assemblies such as magnet assembly 134 may be mounted within recesses in midwall 76 adjacent to recesses 72 in bridge member 74 (FIG. 4). Each magnet assembly 134 may include a first magnet such as magnet 136, a second magnet such as magnet 138, and a magnetic shunt member such as magnetic shunt 140 (formed from a magnetic material such steel). Magnets 136 and 138 may be placed with their poles oriented opposite to each other. In this configuration, magnets 136 and 138 in conjunction with magnetic shunt 140 form a relatively strong horseshoe magnet that attracts teeth 66 on removable access panel 32 to hold removable access panel 32 to computer 10.

As shown in FIG. 10, each rolling latch member 90 may have a bushing 142 that is held in place by a mating screw 144. Bushings 142 are annular in shape and serve as rolling members that reduce friction as rack 78 reciprocates. During disengaging movement of rack 78, bushings 142 roll against ramped surfaces 148 of corresponding hooks 64. Hook engagement surfaces 146 serve as a barrier that blocks rolling latch members 90 and panel 32 from being moved more than a small amount in direction 150. Initial movement of panel 32 relative to housing 28 in direction 150 is prevented by the magnetic attraction between magnet assemblies 134 and corresponding teeth 66 on panel 32. If a shock or other strong force manages to overcome this magnetic attraction, the mechanical locking function of hook surfaces 146 will be used to prevent removal of panel 32.

Figure 11:
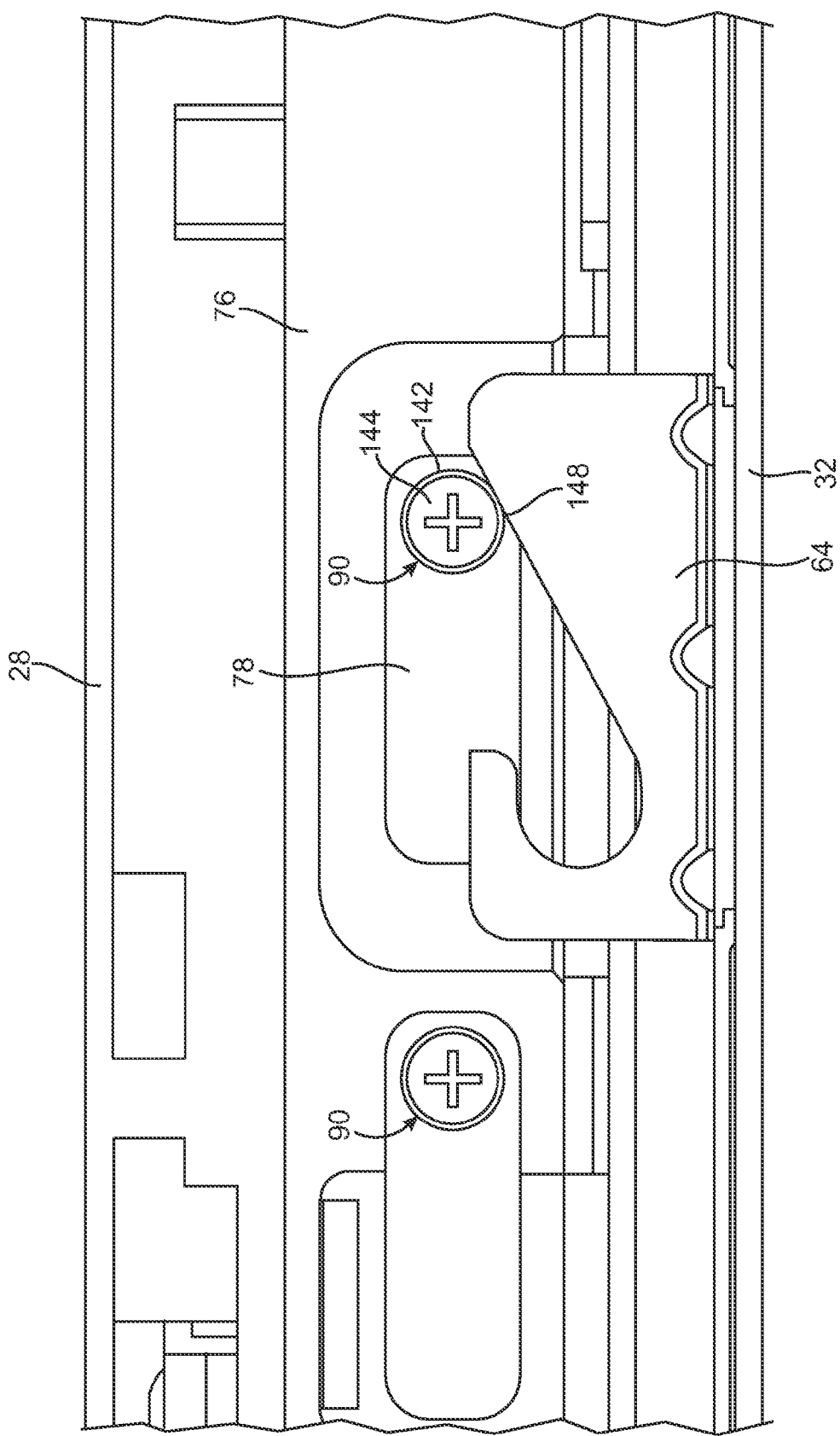
FIG. 11 is a side view of the illustrative latch structures of FIG. 10 in a partially opened state in accordance with an embodiment of the present invention.

FIG. 11 shows how bushing 142 of rolling latch member 90 rolls up and along surface 148 of hook 64 during latch disengagement. Because surface 148 is slanted, this mechanical operation helps to overcome the opposing locking force provided by magnet assemblies 134, thereby stripping panel 32 from housing 28. During disengagement, some rolling latch members 90 such as the right hand latch member 90 of FIG. 11 disengage from hooks 64. At the same time, other rolling latch members 90 such as the left hand latch member 90 of FIG. 11 disengage from tabs on battery 60.

Figure 12:
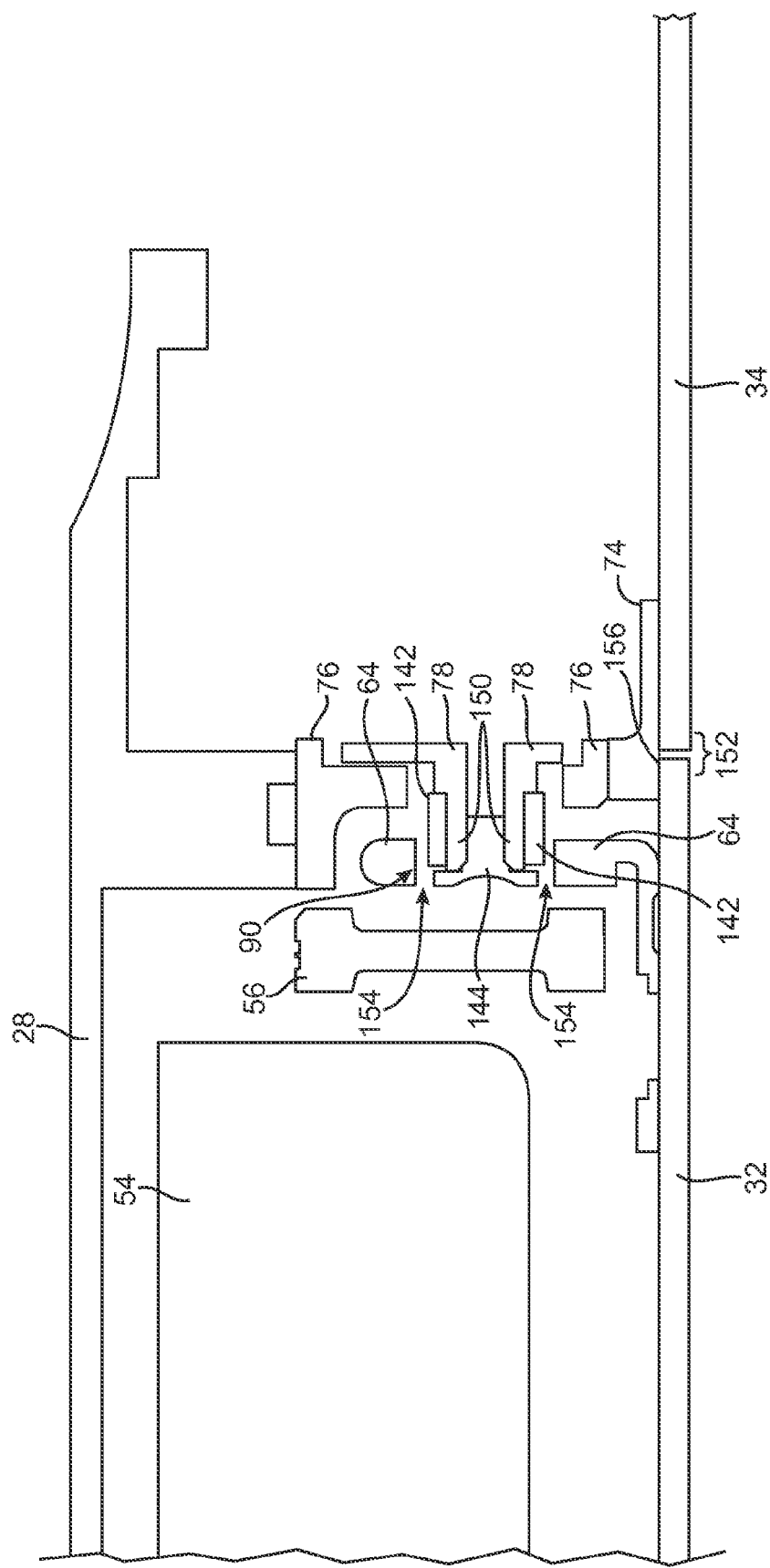
FIG. 12 is a cross-sectional view of an interior portion of a computer in the vicinity of a midwall that supports reciprocating latch structures in accordance with an embodiment of the present invention.

A cross-sectional view of the interior of computer 10 in the vicinity of midwall 76 is shown in FIG. 12. As shown in the cross-section of FIG. 12, bridge 74 may form a ledge such as ledge 156 against which the edge of panel 32 may rest. This ensures that the outer surface of panels 32 and 34 are flush with each other in region 152. Bridge 74 also serves to shield the interior of computer 10 from view through the small gap between panels 32 and 34.

Bushing 142 may rotate around protruding cylindrical portion 150 of rack 78 and may be held in place by screw 144. Portion 150 may be threaded to receive screw 144. Clearance gaps 154 between hook 64 and rolling latch member 90 prevent rolling latch member 90 from adversely affecting the flushness of panels 32 and 34 in region 152.

Figure 13:
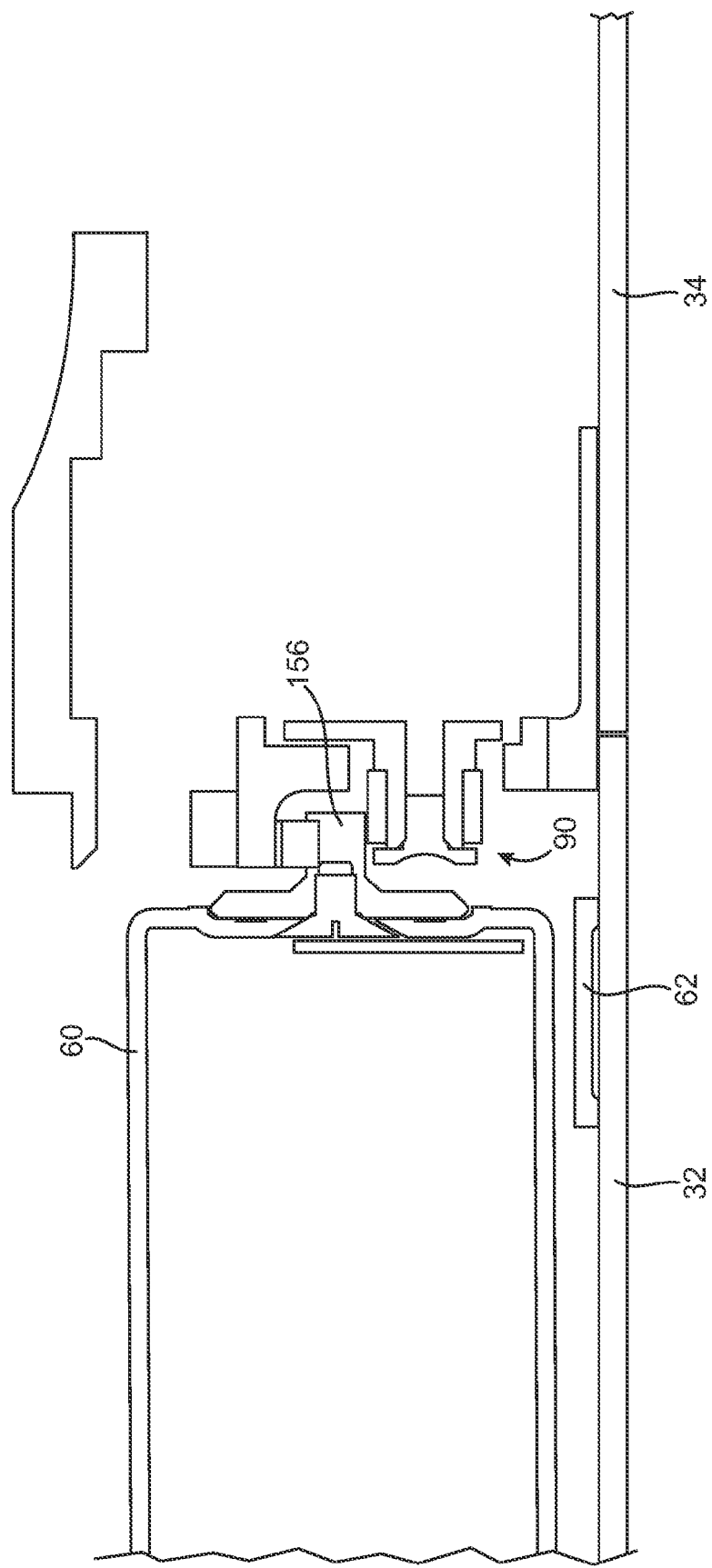
FIG. 13 is a cross-sectional side view of an interior portion of a computer in the vicinity of a midwall showing how rolling latch members may engage tabs or other engagement structures on structures such as a battery when latch structures are placed in a locked position in accordance with an embodiment of the present invention.

The cross-sectional view of FIG. 13 shows how some of rolling latch members 90 may engage tabs or other engagement structures on battery 60 such as tab 156. This helps hold battery 60 in place within the interior of computer 10 when the latching mechanism is in its locked position.

Figure 14:
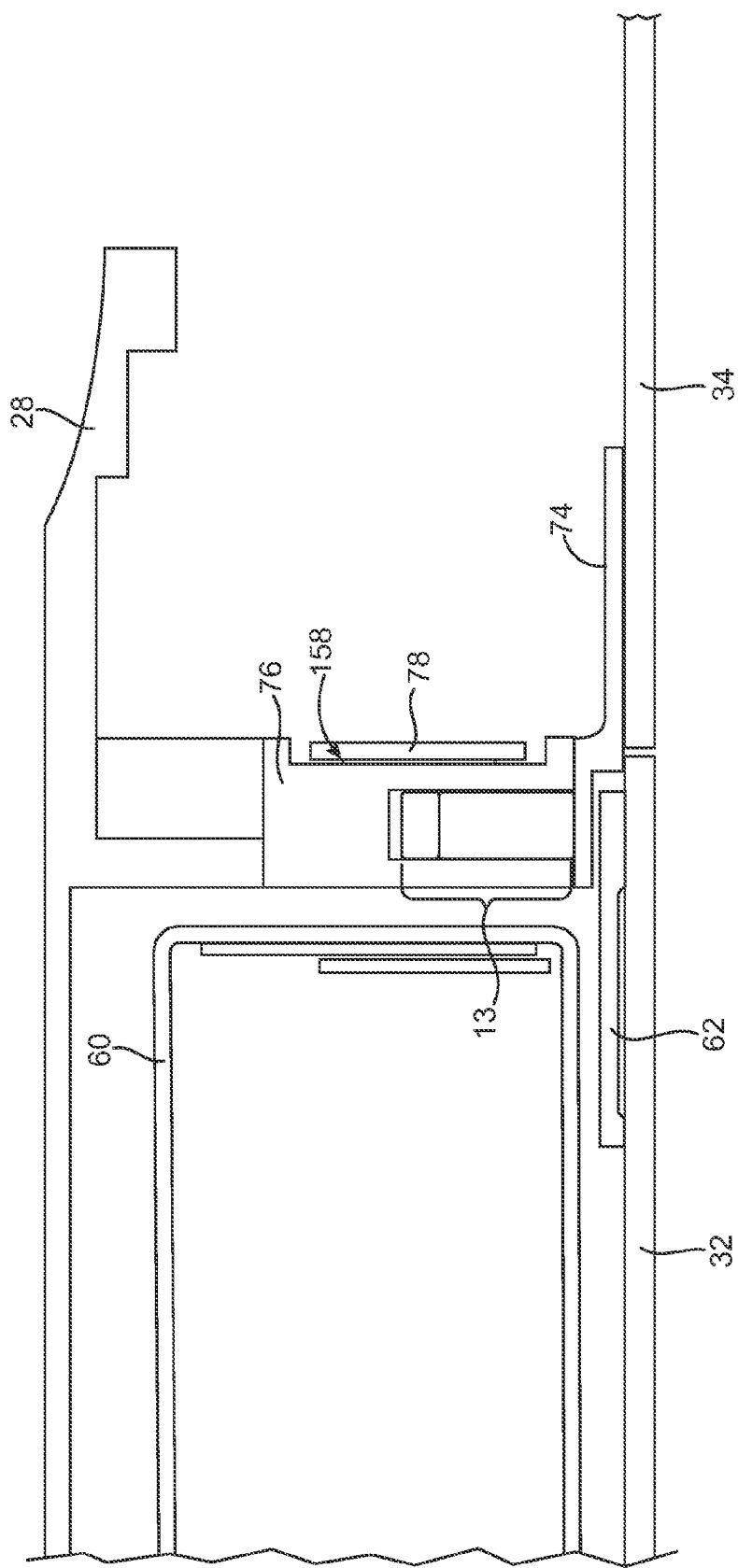
FIG. 14 is a cross-sectional side view of an interior portion of a computer in the vicinity of a midwall showing how magnet assemblies may each be mounted within a recess within the midwall in accordance with an embodiment of the present invention.
Figure 15:
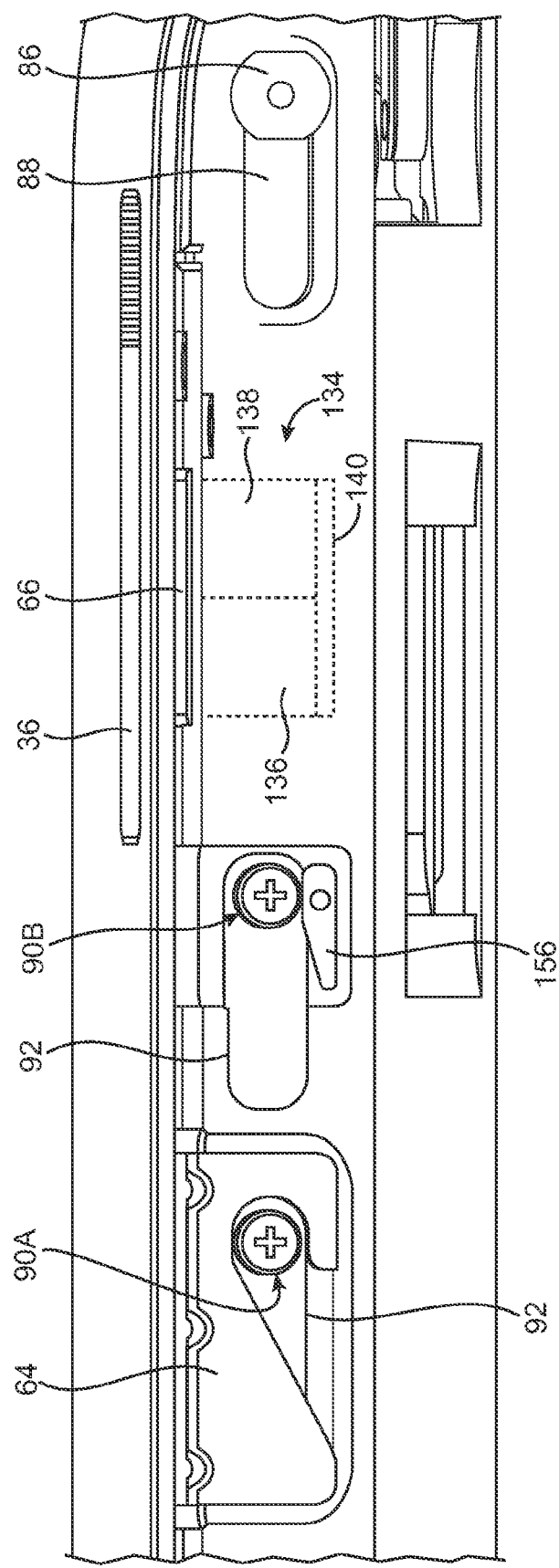
FIGS. 15, 16, 17, and 18 are side views of an illustrative computer latch structure showing how rolling latch members may interact with hooks and battery engagement members at successive stages during the process of disengaging a latching mechanism in accordance with an embodiment of the present invention.

FIG. 14 shows how each magnet assembly 134 may be mounted within a recess within midwall 76. A lubricating member such as plastic strip 158 may be interposed between sliding rack member 78 and midwall member 76 to reduce friction.

Figure 16:
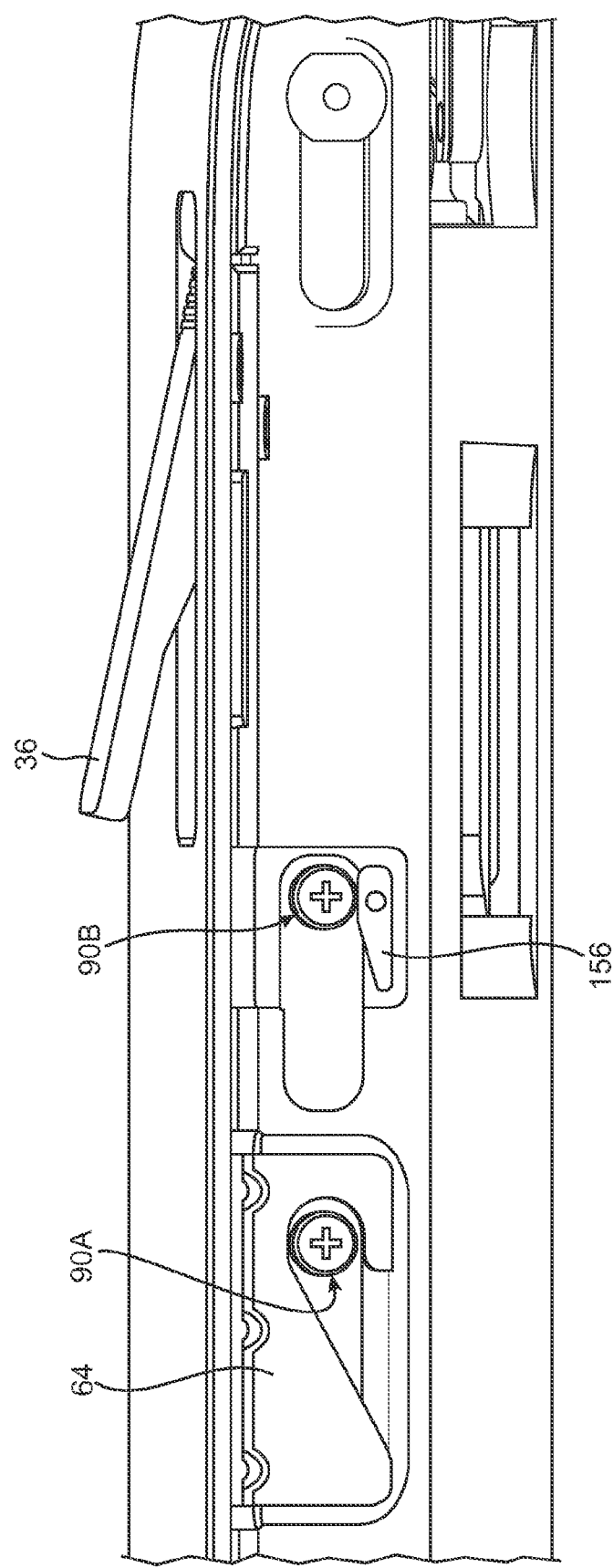
Figure 17:
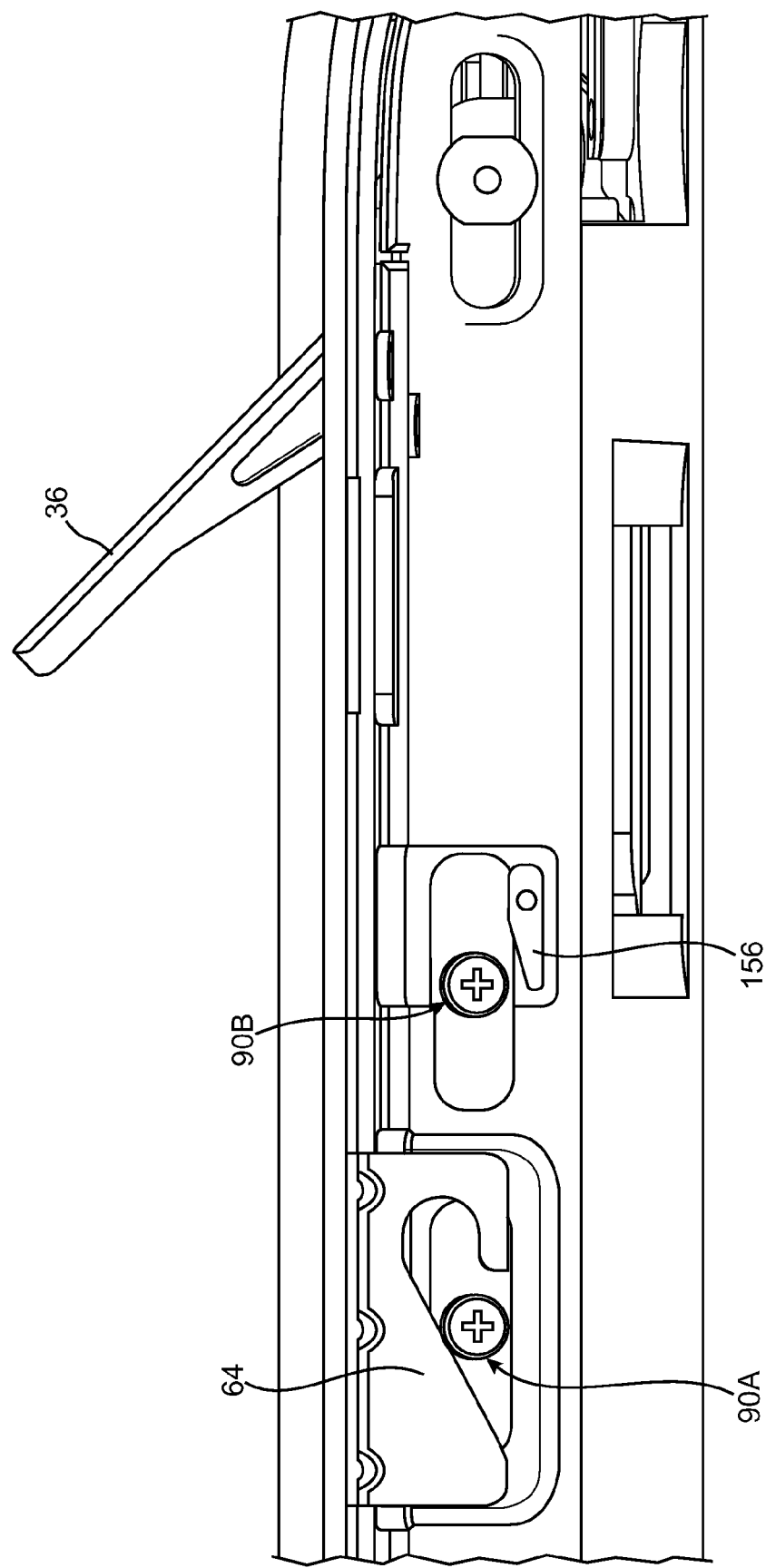
Figure 18:
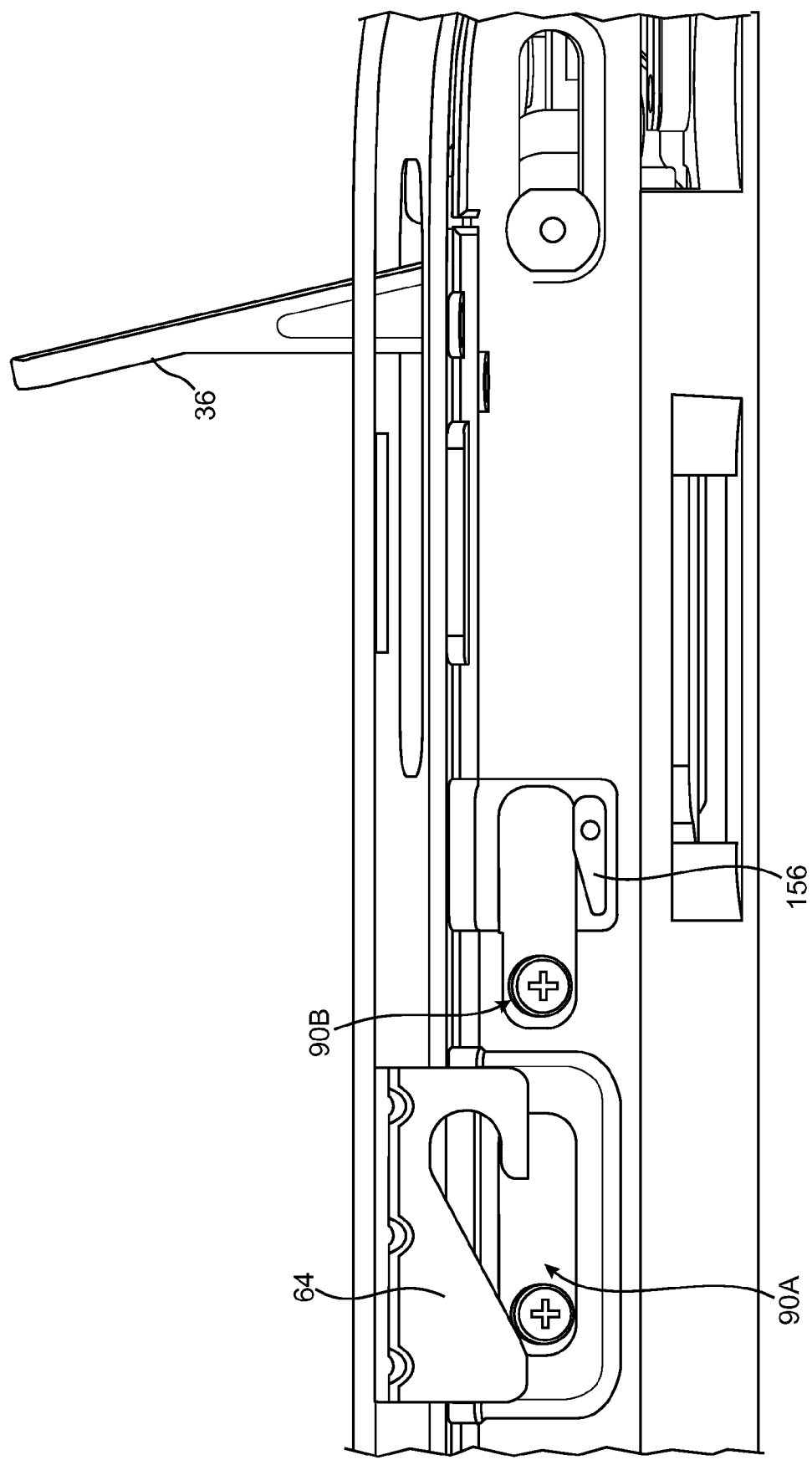

FIGS. 15, 16, 17, and 18 illustrate how rolling latch members 90 interact with hooks 64 and battery engagement members 156 during the process of disengaging the latching mechanism. Rolling latch members 90A interact with hooks 64. Rolling latch members 90B interact with battery engagement members 156. As shown in FIG. 16, the hysteresis provided by slot 105 in yoke 106 allows lever 36 to be partially deployed without moving rack 78.

The foregoing is merely illustrative of the principles of this invention and various modifications can be made by those skilled in the art without departing from the scope and spirit of the invention.

What is claimed is:

1. A portable computer, comprising:
   a housing having a removable access panel; and
   latch structures that hold the access panel in place, wherein the latch structures comprise:
      a lever; and
      an opening into which a lock is inserted to prevent motion of the lever.

2. A portable computer, comprising:
   a housing having a removable access panel; and
   latch structures that hold the access panel in place, wherein the housing has an interior portion under the access panel that is configured to accommodate a removable battery and wherein the latch structures comprise a sliding rack member.

3. The portable computer defined in claim 2 wherein the sliding rack member comprises battery engagement features that engage the removable battery.

4. The portable computer defined in claim 3 wherein the latch structures further comprises a lever that slides the sliding rack member when the lever is actuated and wherein the battery engagement features release the removable battery when the lever is placed in an open position.

5. The portable computer defined in claim 2 wherein the sliding rack member comprises engagement features that engage the access panel to hold the access panel in place on the portable computer.

6. The portable computer defined in claim 5 wherein the latch structures further comprises a lever that slides the sliding rack member when the lever is actuated and wherein the engagement features release the access panel when the lever is placed in an open position.

7. A portable computer, comprising:
   a housing having a removable access panel;
   latch structures that hold the access panel in place, wherein the latch structures comprise:
      a lever; and
      a sliding rack member actuated by the lever.

8. The portable computer defined in claim 7 further comprising magnets that hold the access panel in place on the portable computer.

9. The portable computer defined in claim 7 wherein the lever is movable to a stowed position flush with an exterior surface of the portable computer and wherein the portable computer further comprises a magnet that retains the lever in the stowed position.

10. The portable computer defined in claim 9 wherein the access panel comprises hooks that engage with the latch structures.

11. The portable computer defined in claim 10 wherein the hooks have ramped surfaces that bias the access panel away from the portable computer as the lever is opened to slide the sliding rack member.

12. The portable computer defined in claim 11 further comprising magnets that hold the access panel in place on the portable computer.

13. Portable computer structures, comprising:
    a removable access panel;
    a sliding rail member that engages the removable access panel; and
    hooks with ramped surfaces and members that mate with the hooks and bear against the hooks.

14. The portable computer structures defined in claim 13 wherein the members comprise rolling latch members.

15. The portable computer structures defined in claim 14 wherein the rolling latch members comprise rolling bushings each having a cylindrical plastic cylinder that surrounds a mating cylindrical protrusion.

16. An electronic device, comprising:
    a housing with a removable access panel; and
    a rotating lever that moves between an open position in which the removable access panel is free to be removed and a closed position in which the removable access panel is held in place within the housing.

17. The electronic device defined in claim 16 wherein the housing has an interior and is configured to accommodate a removable battery within the interior under the removable access panel.

18. The electronic device defined in claim 17 wherein the housing comprises an opening into which a lock is inserted and locked to prevent rotation of the lever into the open position.

19. The electronic device defined in claim 18 further comprising a data storage component mounted under the access panel within the housing.

* * * * *